United States Patent

Lailly et al.

[11] Patent Number: 5,808,964
[45] Date of Patent: Sep. 15, 1998

[54] PROCESSING METHOD FOR OBTAINING ZERO-OFFSET SEISMIC DATA BY DEPTH DOMAIN STACKING

[75] Inventors: Patrick Lailly; Bertrand Duquet; Andreas Ehinger, all of Pau, France

[73] Assignee: Institut Francais du Petrole, Rueil-Malmaison, France

[21] Appl. No.: 659,646

[22] Filed: Jun. 6, 1996

[30] Foreign Application Priority Data

Jun. 6, 1995 [FR] France .................................. 95 06887

[51] Int. Cl.⁶ .............................. G01V 1/28; G01V 1/30
[52] U.S. Cl. ................................. 367/53; 367/51; 367/73
[58] Field of Search ................................ 367/50, 51, 52, 367/53, 73

[56] References Cited

U.S. PATENT DOCUMENTS

| | | |
|---|---|---|
| 4,964,103 | 10/1990 | Johnson . |
| 5,067,113 | 11/1991 | Hanson et al. ............................ 367/50 |
| 5,089,994 | 2/1992 | Harlan et al. . |
| 5,229,940 | 7/1993 | Wang et al. . |
| 5,233,569 | 8/1993 | Beasley et al. . |
| 5,243,563 | 9/1993 | Kim . |

OTHER PUBLICATIONS

Lowenthal et al., "The wave equation applied to Migration", Geophysical Prospecting, vol. 24, pp. 380–399, 1976.
Rockliff et al., "3–D depth migration in the Daipir Province of the Central North Sea", 62nd Ann. International Mtg., Soc. Explor. Geophys., Expanded Abstracts, pp. 925–926.

Geophysics Jun. 1989, USA, vol. 54, No. 6, ISSN 0016–8033, pp. 718–729, Al–Yahya K., "Velocity Analysis By Iterative Profile Migration,".

*Primary Examiner*—Ian J. Lobo
*Attorney, Agent, or Firm*—Antonelli, Terry, Stout & Kraus, LLP

[57] ABSTRACT

The object of the method according to the invention is to synthesize zero-offset seismic data from data acquired within the scope of three-dimensional (or possibly two-dimensional) multiple-offset seismic reflection prospecting operations in a subsurface environment. It mainly comprises selection of a distribution model of the velocities in the environment, seismic data prestack migration (stacking of the multiple-offset seismic events is achieved in the depth domain), and synthesis of zero-offset seismic data in the time domain by applying to the results obtained with this depth domain stacking a known modelling technique, for example that referred to as explosive reflector technique. This procedure allows zero-offset extrapolation of the seismic data obtained for non-zero offsets, even in case of great lateral velocity changes in the environment; the stacking performed allows then a much greater improvement of the signal-to-noise ratio than that based on the conventional stacking based on dynamic corrections (with or without dip corrections).

Application: 3D imagery of geologic structures for example.

17 Claims, 7 Drawing Sheets

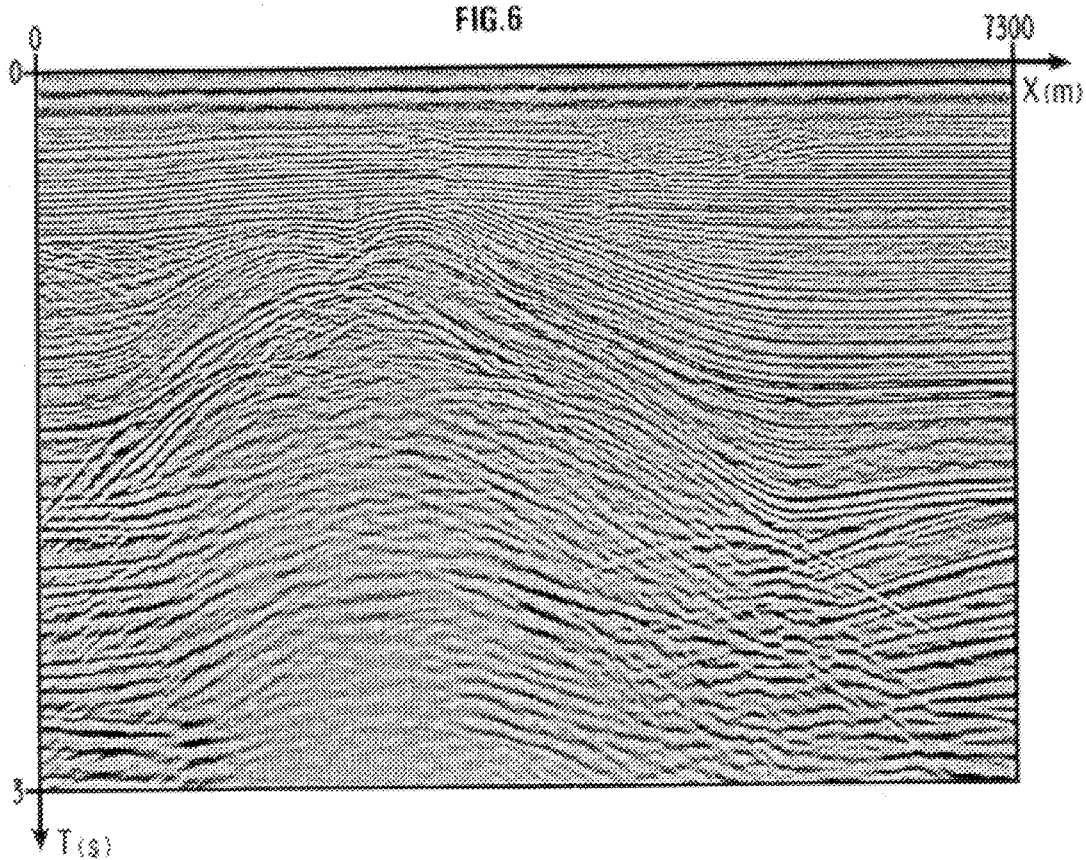

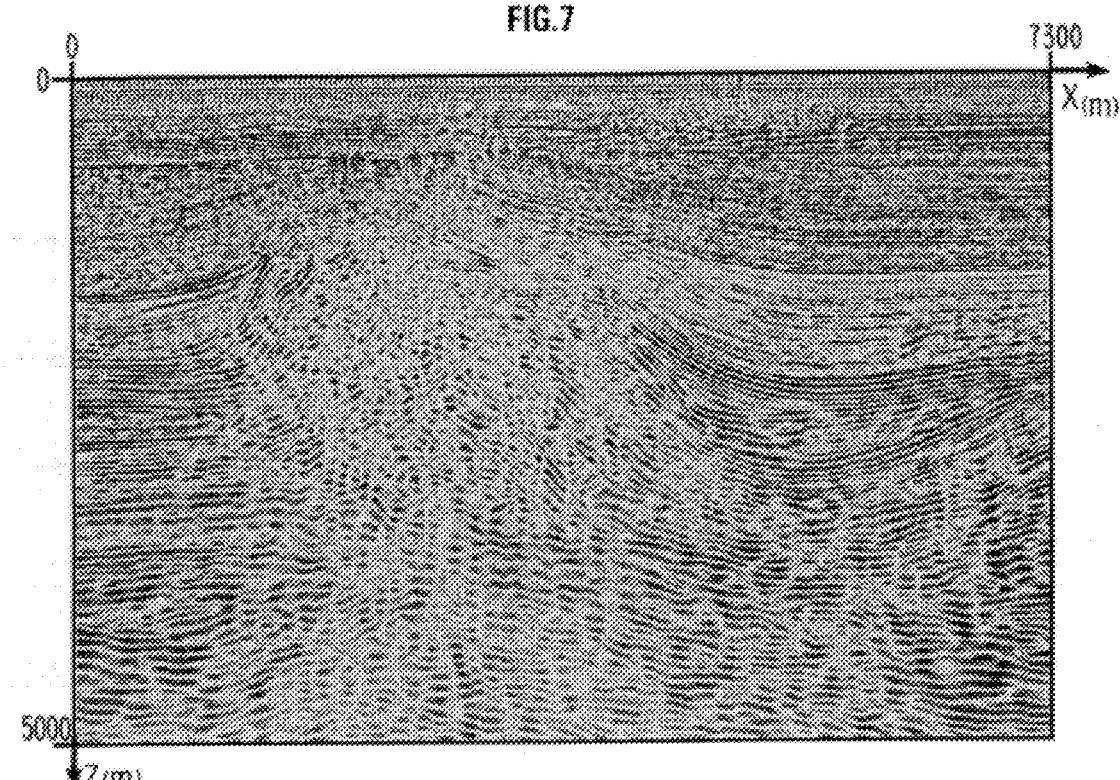
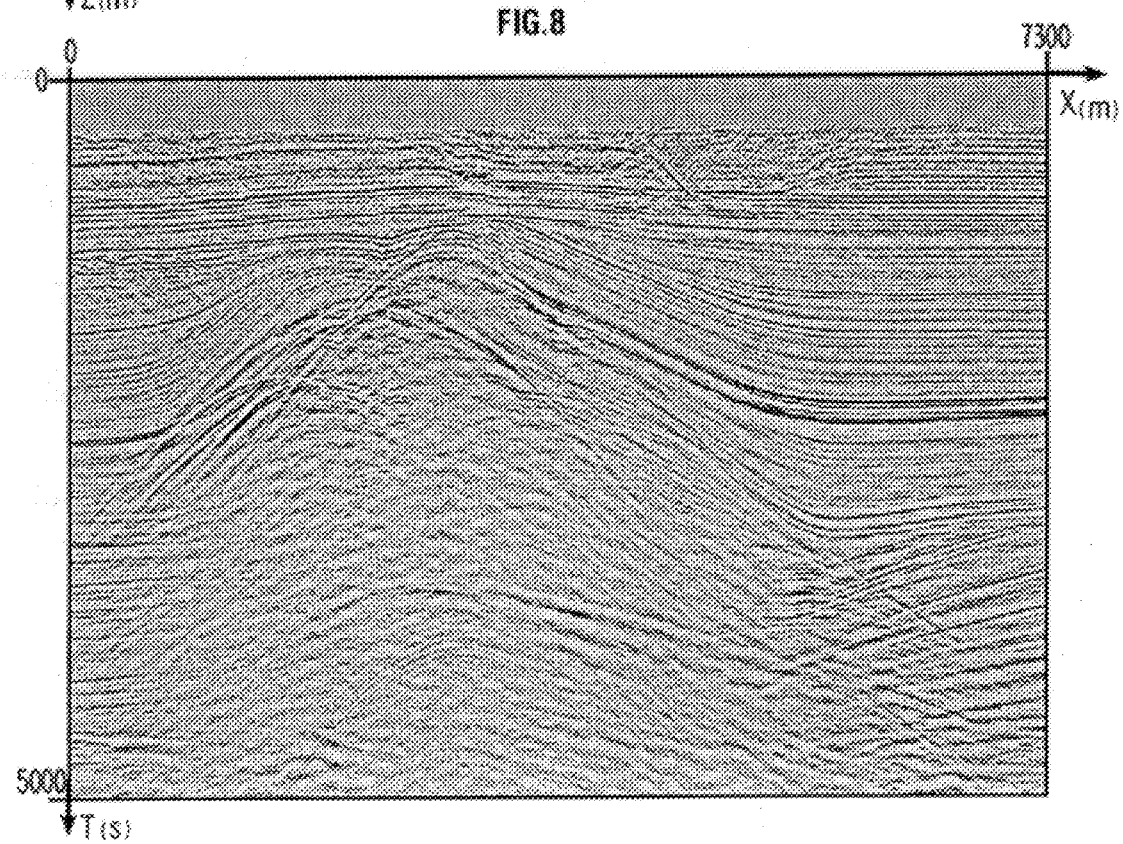

PROCESSING METHOD FOR OBTAINING ZERO-OFFSET SEISMIC DATA BY DEPTH DOMAIN STACKING

FIELD OF THE INVENTION

The present invention relates to a method for processing seismic prospecting data relative to a subsurface zone, allowing the synthesis of seismic data corresponding to the zero offset, from seismic data obtained with multiple offsets. It applies for example to the implementation of the technique referred to by specialists as poststack depth migration.

I BACKGROUND OF THE INVENTION

The seismic imagery of complex geologic structures, for example those involving great lateral velocity changes, requires the use of specific techniques: for example, 3D depth migration techniques, ideally 3D prestack depth migration techniques. Since these techniques cannot be fully valorized as long as the velocity model is not accurate enough, an important stage of the development of the velocity model rests on the use of the 3D poststack depth imagery, for example for implementing a "layer stripping" technique such as that described for example in:

D. G. Rockliff, et al; "3D depth migration in the Diapir province of the central North Sea", 62nd Ann. Internat. Mtg., Soc. Expl. Geophys., Expanded Abstracts, 925–926.

Various procedures (see FIG. 1) are conventionally used to develop the velocity model by using the 3D poststack depth imagery. Two families of procedures can be distinguished for such a development.

1) The kinematic techniques using the arrival times of the reflections: for example map migration, arrival time inversion (reflection tomography), etc, where the interpretation (picking) of the reflections in the "3D poststack seismic data block" can be facilitated by using the 3D poststack time migration followed by a demigration. These kinematic techniques can be considered as a particular case of 3D poststack depth imagery techniques since they allow the construction, from the "3D poststack seismic data block", of a 3D model of the geologic structure: the velocity model in the depth domain.

2) The techniques are based on the use of the result of the 3D poststack depth migration. In this case, interpretation is achieved on the "3D depth migrated seismic data block" and various techniques can be used to develop or to update the velocity model, such as, for example, "layer stripping" techniques (see D. G. Rockliff, et al; "3D depth migration in the Diapir province of the central North Sea", 62nd Ann. Internat. Mtg., Soc. Expl. Geophys., Expanded Abstracts, 925–26 cited above), velocity scan techniques, etc.

The effective use of these techniques does not only require a good 3D poststack imagery software, but also good data ("3D poststack seismic data block"), i.e. data resulting from a suitable stacking, which is difficult to achieve in complex geologic structures.

The aim of conventional stacking techniques is to improve the signal-to-noise ratio by bringing the seismic data obtained with different non-zero offsets to a zero offset (corresponding to the case where the seismic source and the wave receiver are one and the same device). Poststack seismic data are thus often considered as zero-offset seismic data and the depth imagery (for example the depth migration) of poststack data is likened to the depth imagery of zero-offset seismic data. This comparison generally relates to the seismic data for which the outward path (before reflection) coincides with the return path (after reflection), which thus corresponds to a so-called "exploding reflector" experiment. This "exploding reflector" technique, where the reflectivity is considered as a seismic source exciting the environment in the neighbourhood of the time t=0 and where the propagation velocities are divided by two so that a single path corresponds to an outward-return path, is for example described in:

D. Loewenthal, et al; 1976, "The wave equation applied to migration", Geophysical Prospecting, 24, 380–399.

In the description hereafter, zero-offset data depth migration will therefore be considered to be similar to poststack depth migration.

Conventional stacking techniques rest on dynamic normal-moveout corrections called NMO corrections, defined by stacking velocities resulting themselves from velocity analysis techniques, These techniques are justified if the time-distance curves (arrival time curves) are assumed to be hyperbolic functions of the offset for a given midpoint (CMP), and if good stacking velocities are available. The existence of difficulties resulting from reflector dips has led to introduce, prior to the conventional stacking, dip corrections called DMO corrections.

It is well-known that the selection of DMO correction algorithms is rather critical. Some allow the stacking of seismic events associated with dips at high angles, however subject to restrictive hypotheses linked with the use of these dip corrections.

The existence of great lateral velocity changes leads to an additional difficulty, the conventional stacking (even after DMO dip corrections) having little chance of producing a constructive stacking, In this case, the 3D depth migrated seismic data block is difficult to exploit because of its bad quality (FIG. 2).

It is therefore natural to try to repeat the stacking, for example by limiting it to low offsets. Such an operation is not so simple since it requires the detection of the curvature of the hyperbolas assumed to represent the time-distance curves. Furthermore, in this operation, the bad signal-to-noise ratio, as a result of the limitation to near offsets only, could be a handicap. The multiple reflections (considerable in the example illustrated) and the average quality of the display of deep seismic events straight above the dome might seriously hinder the interpretation required for the development of the velocity model.

The image obtained by 2D prestack migration applied to an acquisition profile (FIG. 4) shows a marked improvement, notably for the display of deep seismic events straight above the dome. However, the image is not completely satisfactory since it does not take account of the three-dimensional aspects of the propagation, unlike the result in FIG. 2.

The method according to the invention is aimed at exploiting the qualities of the images obtained by prestack migration for the implementation of the 3D poststack depth imagery, avoiding thereby the drawbacks of the prior methods.

SUMMARY OF THE INVENTION

The object of the method according to the invention is to synthesize zero-offset seismic data from data acquired within the scope of multiple offset and (notably three-dimensional) seismic reflection prospecting operations in a subsurface environment. It comprises the following stages:

a) selecting a velocity distribution according to each of the dimensions of the environment explored (velocity model in the depth domain), b) applying a prestack depth migration to the seismic data, achieving thereby a stacking of the seismic events in the depth domain, and c) synthesizing the zero-offset seismic data in the time domain by applying a technique of zero-offset wave propagation modelling to the results obtained with said stacking in the depth domain, the velocity model used for this modelling being the same as that used for the prestack migration.

The method can further comprise a depth migration of the poststack seismic data, optionally followed by a development or an updating, from the interpretation of the resulting seismic data, of the velocity model selected by using for example a "layer stripping" technique or a technique known as migration velocity scan.

It can also comprise developing or updating the velocity model from the interpretation, in the time domain, of the seismic data synthesized by means of the method, whether time migration techniques are used or not for this interpretation.

The method presents many advantages.

The main advantage is that it allows a zero-offset extrapolation of the seismic data obtained for non-zero offsets, even in case of complicated kinematics (i.e. of non hyperbolic time-distance curves on midpoint collections (CMP)) resulting for example from great lateral velocity changes in the environment.

It also offers the additional advantages as follows:

It allows attenuation of the noises (incoherent noises, coherent noises such as multiple reflections, converted waves, surface waves, guided waves, etc) thanks to the stacking of events in the depth domain. As a result of the possibility of stacking along non hyperbolic time-distance curves on the one hand, and of the very high degree of coverage achieved upon stacking in the depth domain on the other hand, noise attenuation is much more effective than with a conventional stacking (based on dynamic corrections NMO) where the coverage is much lower. Consequently, the method allows a very reasonable attenuation of noises from a very limited subset of recorded data: an implementation of the method on decimated data (shooting decimation, offset range decimation or reduction) allows the calculation costs to be substantially reduced.

Unlike conventional stacking techniques (NMO and possibly DMO stacking) that rest on a velocity analysis, the method according to the invention is entirely automatic once a velocity model is defined (in the depth domain). The quality of this model (i.e. the precision with which it represents the real propagation velocity distribution) influences the stacking quality, i.e. the signal enhancement and the noise attenuation. However, this is the only effect of the velocity model. Even if stacking is performed in the depth domain, the kinematics of zero-offset events synthesized with the method is not affected by the velocity model selected: it is intrinsic. It can be noted that the quality of the stacking achieved can be optionally controlled for example by examining the normalized stack amplitude in the depth domain (FIG. 6).

BRIEF DESCRIPTION OF THE DRAWINGS

Other features and advantages of the method according to the invention will be clear from reading the description hereafter of an embodiment given by way of non limitative example, with reference to the accompanying drawings in which:

FIG. 6 shows the zero-offset record section (T representing time) synthesized with the method according to the invention, applied to the acquisition profile considered, FIG. 7 shows, for the acquisition profile considered, the result of a quality control of depth domain stacking, by examination of the "normalized stacked amplitude", FIG. 8 shows the section, associated with the profile considered, extracted from the conventional non migrated 3D poststack seismic block.

II DESCRIPTION OF THE METHOD

Figure 1:
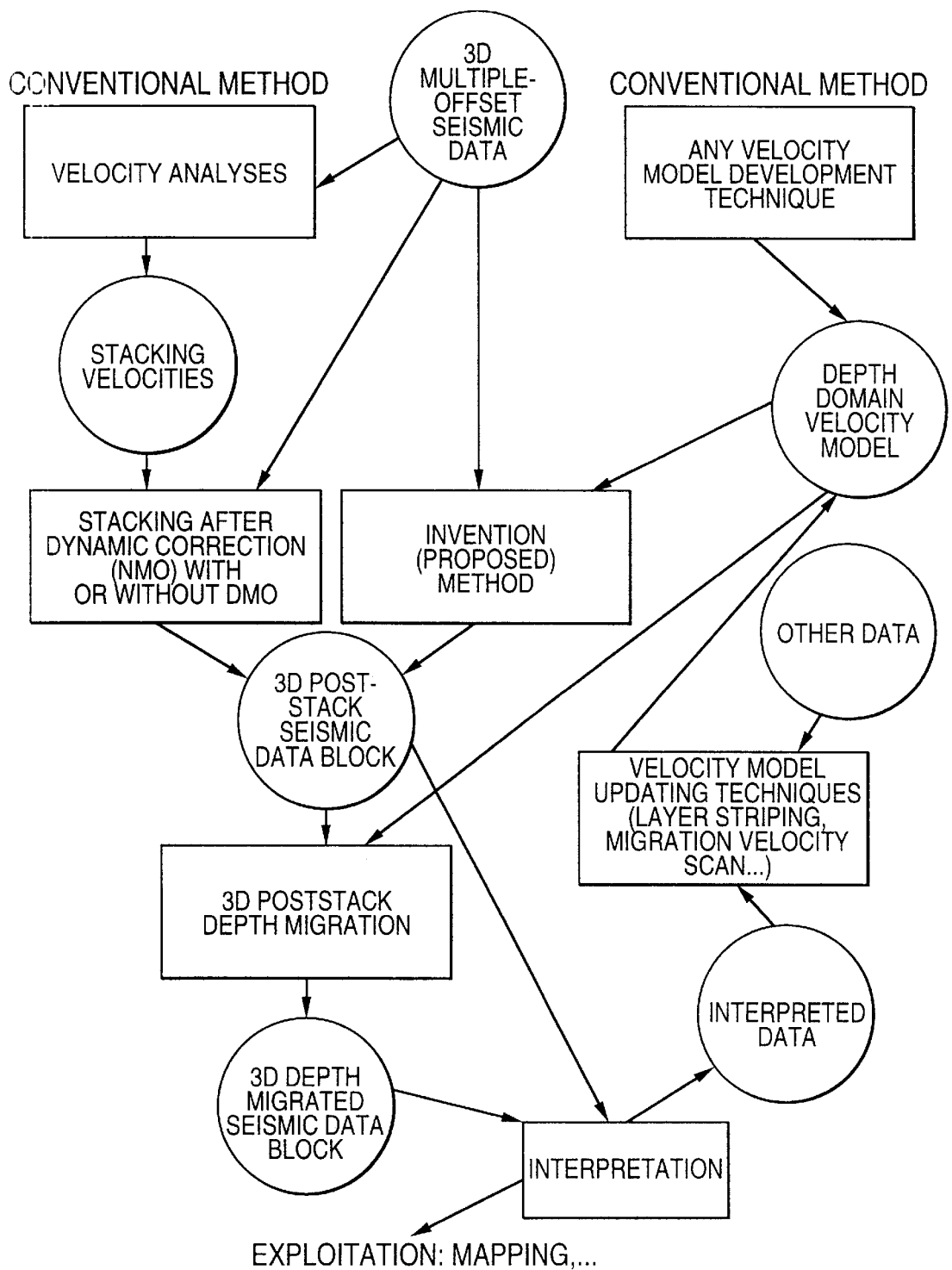
FIG. 1 shows how the procedure of the method according to the invention distinguishes itself from the prior methods.

It may be reminded that the procedure followed consists in selecting a velocity distribution (or velocity model) according to each of the dimensions of the environment explored, in applying to the seismic data a prestack depth migration, achieving thereby stacking of the seismic events in the depth domain, and in synthesizing the zero-offset seismic data in the time domain by applying a technique of zero-offset wave propagation modelling to the results obtained with said depth domain stacking, the velocity model used for this modelling being the same as that used for implementing the prestack migration.

Prestack migrated events being always stationary in the neighbourhood of the zero offset, the seismic data stacking that is achieved in the depth domain is always coherent in this neighborhood and the result of this depth domain stacking is thus the zero-offset migrated image (with the velocity distribution selected) of the data. The appellation "depth domain stacking" used here is justified since a prestack depth migration of the seismic events is achieved.

As stated above, the stacking is always coherent in the neighborhood of the zero offset, whatever the velocity model selected. In practice, the availability of seismic data for low offsets is essential to guarantee the constructive aspect of the stacking, and consequently the improvement of the signalto-noise ratio will be all the greater as the velocity model is more accurate. Quality controls (for example the representation of the "normalized stacked amplitude") allow to analyze the quality of the stacking achieved in the depth domain.

As defined by Yilmaz: "Seismic data processing", Investigation in Geophysics No.2, Society of Exploration Geophysicists, Tulsa, 1987, what is referred to as the "normalized stacked amplitude" is the quantity, always ranging between −1 and 1, $$\left(\sum_i e_i\right) / \left(\sum_i |e_i|\right)$$

where i is the stacking index of the samples $e_i$.

The result of the depth domain stacking thus being the zero-offset migrated seismic image, the synthesis of the zero-offset seismic data (i.e. the return to the time domain) is obtained by applying to this result (considered then as a subsoil reflectivity model) a technique of zero-offset wave propagation modelling, the velocity model used for this modelling being the same as that used for the prestack migration.

The aforementioned so-called "explosive reflector" technique can be used for this modelling. In this case, the prestack migration having provided the migrated image of the zero-offset data for the velocity model selected, the result of this modelling will actually be the zero-offset seismic data since modelling by explosive reflectors and poststack migration are two inverse operations. This result remains true □ as regards kinematics, even if the simplification by exploding reflector is not used for the modelling. The kinematics of the synthesized zero-offset seismic events is thus independent of the velocity model selected: it is intrinsic.

Various strategies can be considered for implementing the method and, for each strategy, various calculation algorithms.

II.1 Various Implementation Strategies

1—Use of the 3D Prestack Depth Migration

This strategy allows to one tackle very difficult problems where it is particularly important to take into account the 3D effects. The calculation costs handicap such a strategy at the present time. However, on account of the expected decrease in the calculation rates and of the seismic acquisition evolution (which will make the calculations required for 3D prestack migration less heavy), the method is very interesting with a view to improving the velocity model by any well-known technique, such as the "layer stripping" technique, using 3D poststack migration results since it is less costly to iterate on the results of a 3D poststack depth migration than on the results of a 3D prestack depth migration.

2—Use of the 2D prestack depth migration for 3D implementations

In cases where seriate-profile seismic data are available, the method can be implemented by replacing the 3D prestack migration mentioned in II.1 §1 above by a series of 2D prestack migrations. Implementation of this strategy requires the following stages:

organization of the 3D data in rectilinear (or quasi-rectilinear) profiles by means of suitable projections or any other technique, division of the 3D velocity model into vertical slices associated with these profiles, For each profile:

a prestack migrated section has to be obtained from the profile data with any 2D prestack migration algorithm, by using as a velocity model the vertical slice associated with the profile (or an approximation to this model), the zero-offset seismic data associated with the profile have to be obtained by means of a zero-offset wave propagation modelling, by "exploding reflector" or by any other technique, using as base data the 2D prestack migrated section and the same velocity model as that used for obtaining this migrated section, the zero-offset data synthesized for each profile have to be organized in 3D data blocks. This operation is evident if the profiles have been selected rectilinear, parallel and sufficiently close; in the opposite case, conventional interpolation techniques must be used.

The synthesized 3D data block is ready to serve as exploitable data for an interpretation or to serve as input for 3D poststack depth migration algorithms.

Such an implementation is particularly well-suited to 3D marine seismic acquisitions when the pickup profiles are not too far away from the shooting profiles, which allows access to the low-offset seismic data whose essential aspect has been stressed.

The interest of this implementation strategy in relation to the strategy mentioned in II.1 §1 lies in the considerable decrease (at least with the current seismic acquisitions) in the cost of the calculation resulting from the replacement of the 3D prestack migration by a series of 2D prestack migrations.

As a consequence of this simplification, the method will provide really satisfactory results only if it may be reasonably considered that the waves recorded on each profile have propagated along paths (rays) that do not deviate too much from the vertical plane passing through the profile. The reliability of the method as regards this simplifying hypothesis and as regards the accuracy of the velocity model selected must nevertheless be noted: the method proceeds by stacking of events which in any case are stationary in the neighborhood of the zero offset; the main issue is the signal-to-noise ratio and the kinematics of the synthesized zero-offset data will always be correct.

Figure 2:
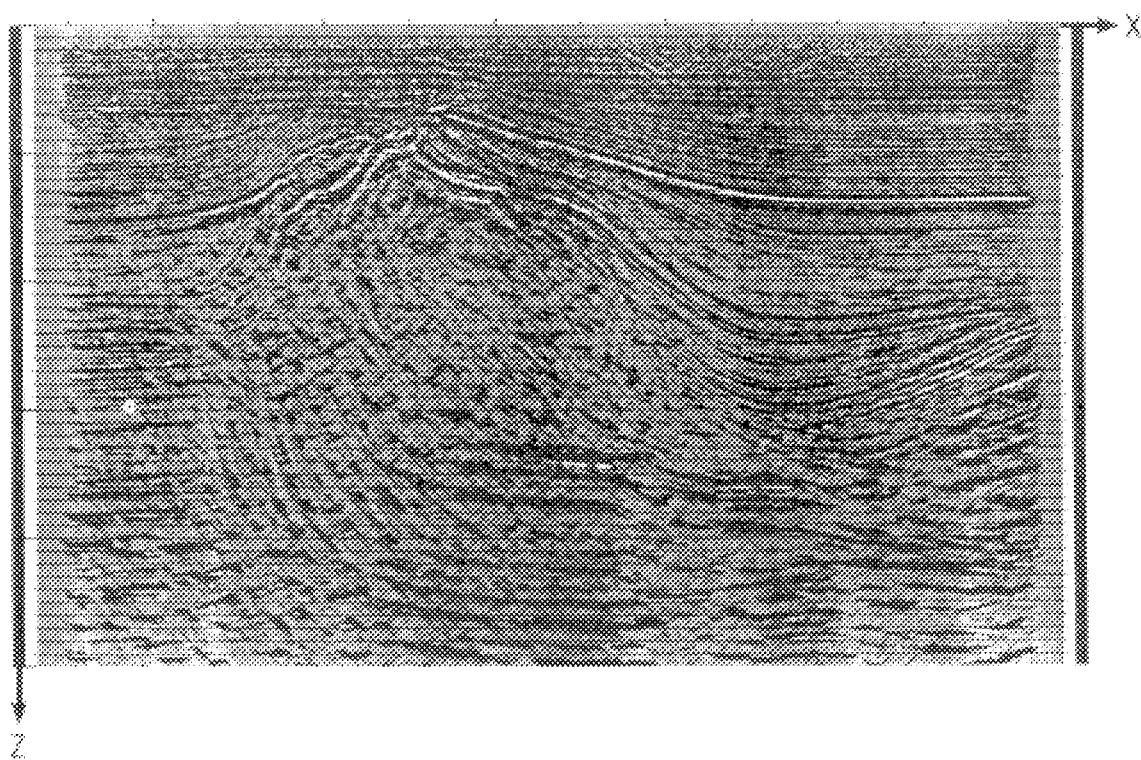
FIG. 2 shows a record section along two axes X, Z representing respectively the horizontal position along a seismic profile and the depth, extracted from a 3D poststack depth migrated data block, obtained within the scope of the seismic exploration of a salt structure in the North Sea, the velocity model used to implement this migration (shown in FIGS. 3a, 3b) having been obtained with the map migration technique.
Figure 3A:
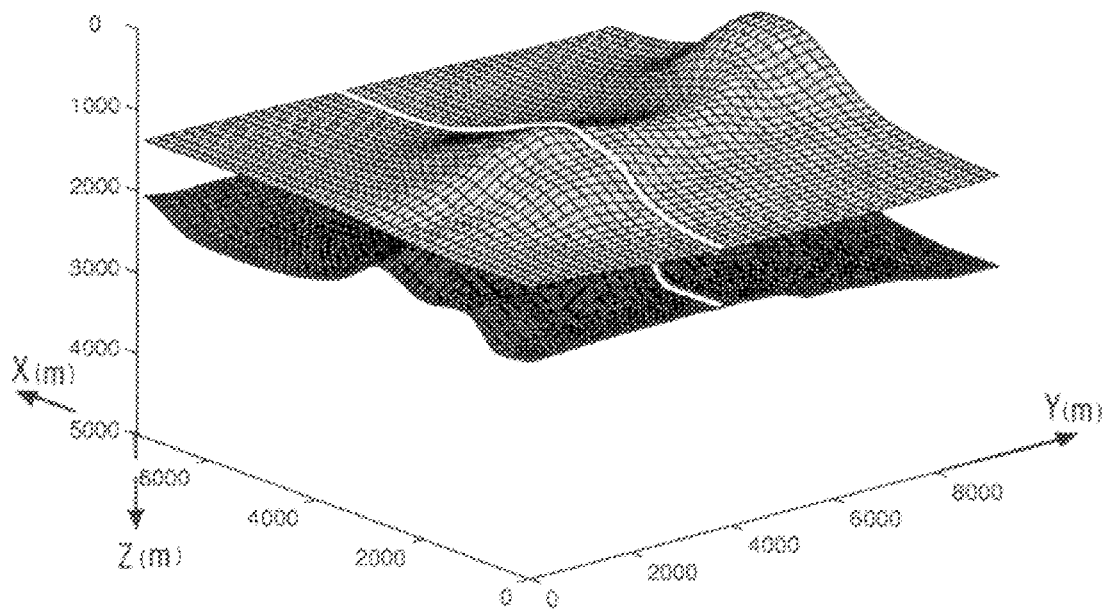
FIGS. 3a and 3b show the 3D velocity model along three axes X, Y, Z, representing respectively the horizontal position along a seismic profile, the horizontal position transverse to the seismic profile and the depth, that is used to obtain the results presented in FIG. 2 as well as to implement the method according to the invention (in order to simplify the graphical representation, only the bases of layers 1 and 2 are shown in FIG. 3a, and in FIG. 3b, only the bases of layers 4 and 6, although the model comprises 7 layers in actual fact); the velocities range between 1800 m/s (1st layer) and 4500 m/s (7th layer)
Figure 3B:
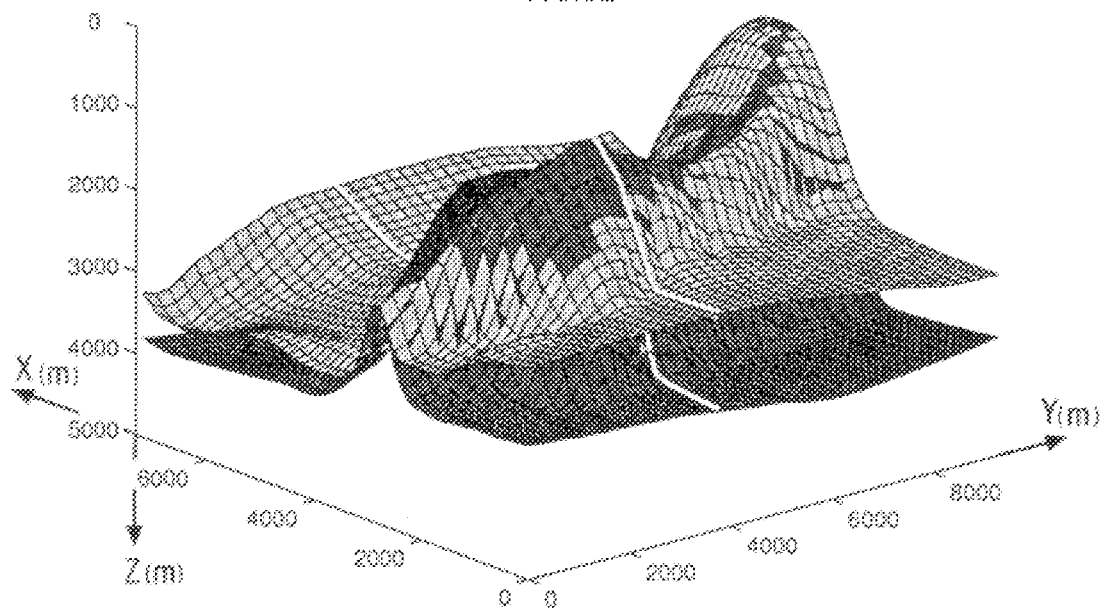
Figure 4:
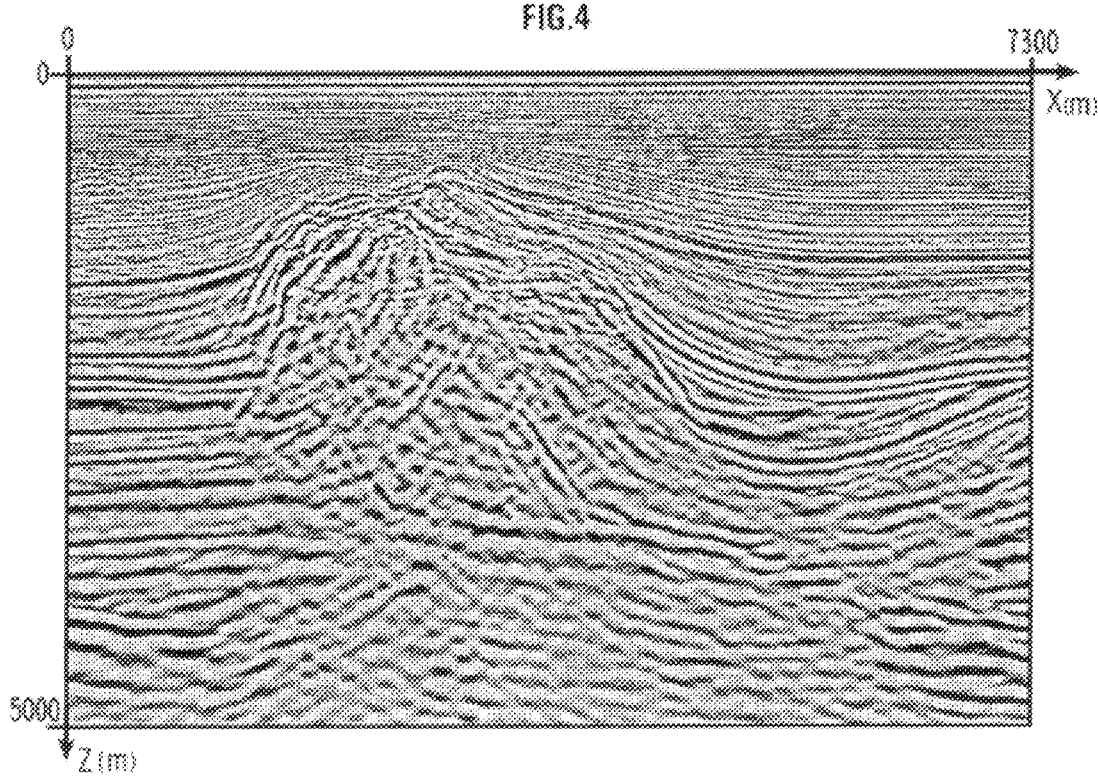
FIG. 4 shows the record section obtained by 2D prestack depth migration of the data of the acquisition line coinciding with the record section of FIG. 2.
Figure 5:
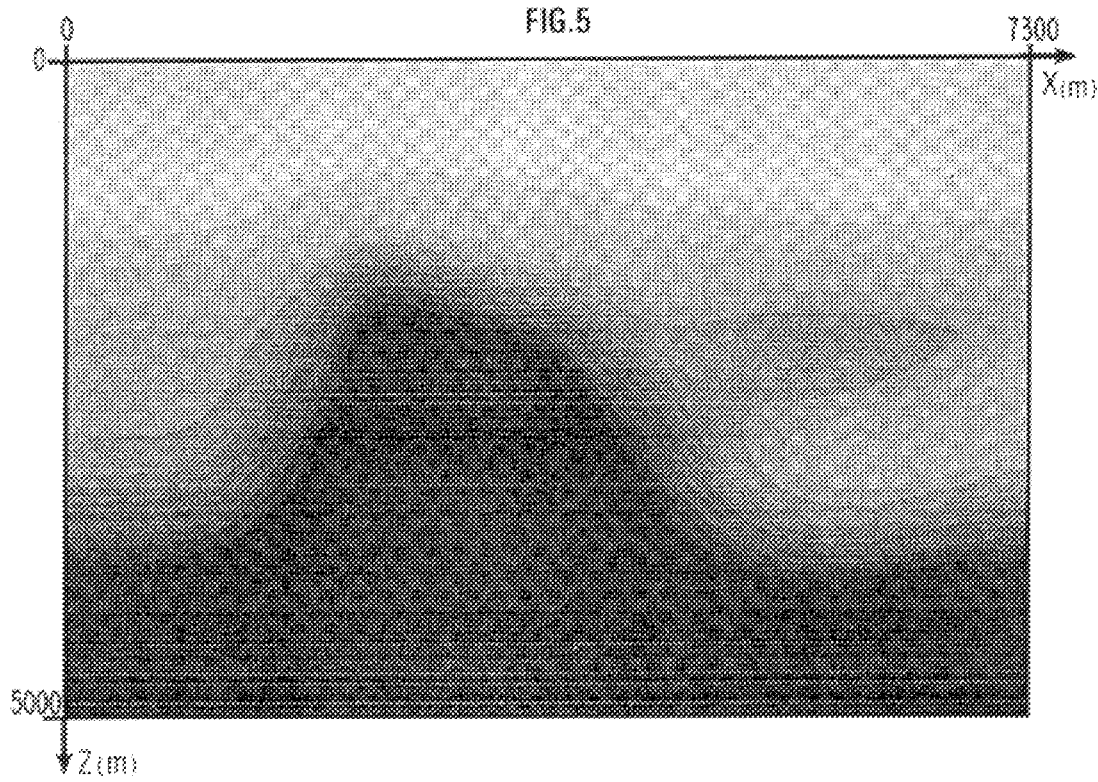
FIG. 5 shows the velocity model used to obtain the result of FIG. 4, this model being a vertical slice passing through the profile of a smoothed version of the velocity model of FIG. 3, the velocities ranging between 1627 m/s (lighter parts) and 4500 m/s (darker parts)
Figure 9:
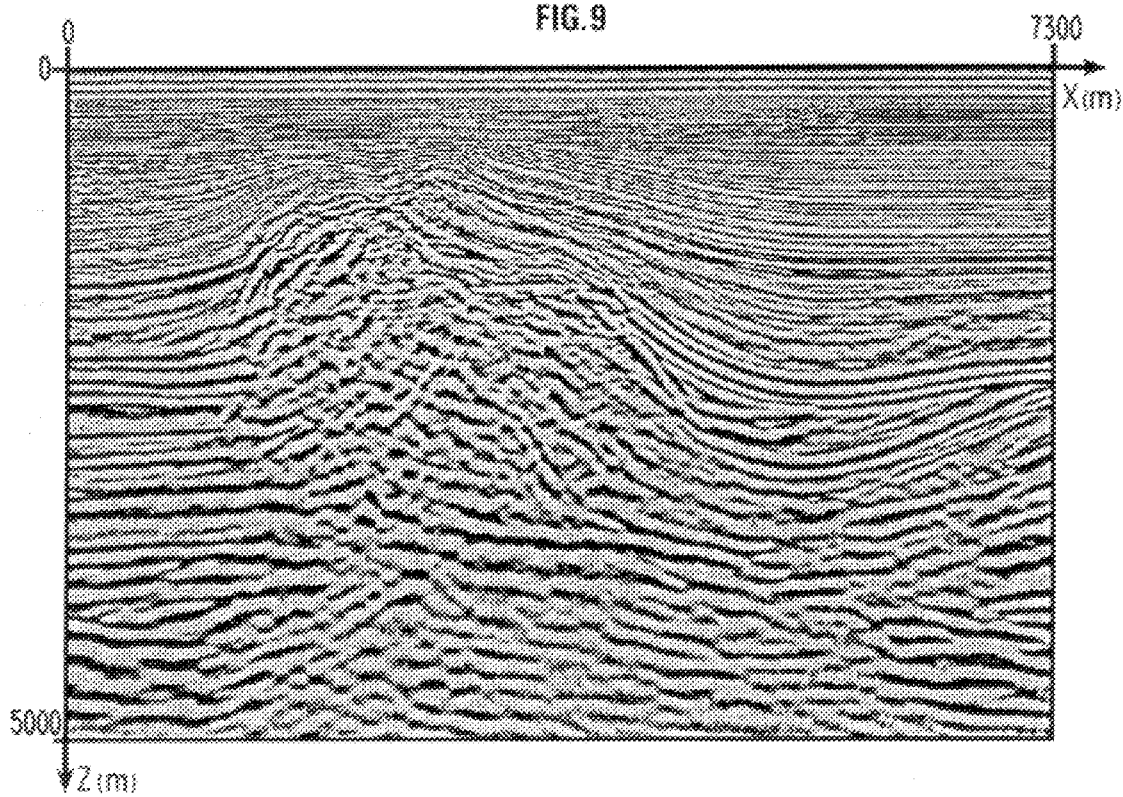
FIGS. 9 and 10 show a comparison of the results of 2D poststack depth migrations applied respectively to the data of FIGS. 6 and 8 with the velocity model of FIG. 5.
Figure 10:
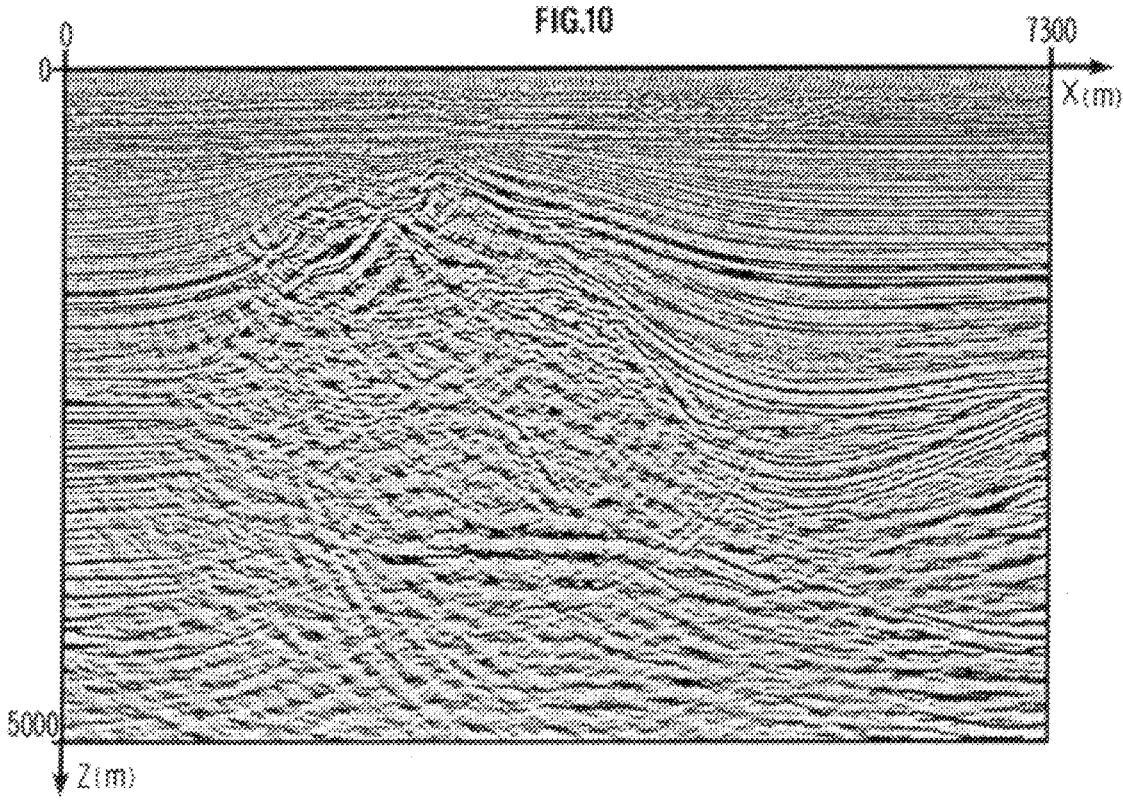

The method has been applied on the acquisition line coinciding with the section of FIG. 2. The zero-offset section obtained by implementing the method is shown in FIG. 6. It can be noted that it is substantially different from the corresponding section extracted from the conventional non-migrated 3D poststack seismic block (FIG. 8) and that it is more suitable than the latter for the structure imagery, as can be seen from the comparison of the 2D poststack depth migration results obtained from these sections (FIGS. 9 and 10) and from the comparison of the 3D poststack depth migration result of FIG. 2.

Implementation of the method on the various acquisition profiles allows to obtain a 3D zero-offset seismic block ready to serve as data exploitable for an interpretation or to serve as input for 3D poststack migration algorithms.

II.2 Various Calculation Algorithms

A velocity model having been selected, the method requires algorithms:

for prestack migration for wave propagation modelling.

1—Prestack Migration

Whether the implementation is based on the use of 3D prestack migration II.1 §1) or on the use of 2D prestack migration (II.1 §2), various prestack migration algorithms can be envisaged, corresponding to:

various seismic data assemblies (offset, shotpoint, plane wave, receiver, s-g migration algorithms, etc), such as those presented for example by:

N. O. Whitmore et al; 1993, "Common offset and common angle prestack depth migration applied to North Sea data", 63rd Ann. Internat. Mtg., Soc. Expl. Geophys., Expanded Abstracts, 886–887, or by A. J. Berkhout; 1984, "Seismic migration: B. practical aspects", Elsevier.

various wave propagation modelling techniques (numerical waveform modelling, Green's functions calculation by kinematic techniques, Green's functions calculation by waveforms);

various imagery principles presented for example in:

J. F. Claerbout; 1971, "Towards a unified theory of rflector mapping", Geophysics, 36, 467–481, or in:

A. J. Berkhout; 1984, "Seismic migration: A. theoretical aspects", Elsevier.

Even if the calculations are sometimes organized differently, all of these algorithms have the same principle in common (hence the term prestack migration):

first to conduct a repositioning of the events (migration) by wave propagation modelling using the velocity model selected and by applying an imagery principle, then to conduct a stacking of the seismic events repositioned.

2—Zero-Offset Wave Propagation Modelling

Whether it is the implementation presented in II.1 §1 or that presented in II.1 §2, this stage consists in calculating the zero-offset seismic response from:

the prestack migration result considered as the zero-offset reflectivity of the environment, the velocity model used for implementing this prestack migration.

For the implementation presented in II.1 §1, a 3D wave propagation modelling has to be achieved, and for those presented in II.1 §2, a series of 2D wave propagation modellings has to be achieved.

A great variety of algorithms can also be envisaged for carrying out this stage: for example, the numerical techniques of waveform modelling (based on the numerical solution of a wave equation or of one of its approximations such as those based on paraxial approximation) or the so-called ray technique.

A particularly attractive approach for this zero-offset wave propagation modelling is that based on the simplification of the exploding reflectors described for example by:

D. Loewenthal, L. Lu, R. Robertson, J. Sherwood; 1976, "The wave equation applied to migration", Geophysical Prospecting, 24, 280–399.

If the outward path (before reflection) and the return path (after reflection) are assumed to be identical, it all amounts to considering, at least as regards the kinematics, the reflectivity of the environment as the "source" term acting in the neighbourhood of the time t=0, if the velocity has been divided by 2 (so that a single path corresponds to an outward-return path).

If the imagery principle used for the zero-offset depth migration and the "source" term used for the exploding reflector modelling are properly defined, it can be shown that, in cases where the wave propagations are modelled by a paraxial wave equation approximation, each of these two operations is the inverse of the other, which justifies that the zero-offset seismic data synthesized with the method do not depend on the velocity model and therefore have an intrinsic character (as mentioned at the beginning of section II). In cases where such precautions are not taken for the definition of the imagery principle for zero-offset depth migration and of the "source" term for exploding reflector modelling, the method remains applicable since the result remains true as regards the kinematics of the data that make up the seismic information useful for the imagery of geologic structures.

III APPLICATIONS OF THE METHOD

The method according to the invention has interesting applications, notably for the 3D seismic imagery of geologic structures exhibiting great lateral velocity changes, i.e. those where resorting to depth imagery is important for displaying the structures. The quality of the velocity model having an effect upon the quality of the result, the method is significant at the stage where a first depth domain velocity model has been created. Such a model may have been obtained from conventional poststack data by "map migration", an operation that is well-known to specialists, or by implementing the "layer stripping" technique defined above, or by means of other techniques (tomography, migration velocity scan, etc).

Owing to the quality thereof, the zero-offset data synthesized with the method are particularly suitable for an interpretation or as input data for a 3D poststack depth migration process:

for the final obtaining of a 3D depth migrated seismic data cube when a velocity model has been definitely selected, for the development of a velocity model by implementing the aforementioned "layer stripping" technique, the quality of the input data exploited greatly facilitating the picking of the layer boundaries on the result of the 3D poststack depth migration, or for the development of the velocity model by any method using the 3D poststack depth migration results.

We claim:

1. A method for synthesizing zero-offset seismic data from seismic data acquired in multiple-offset seismic reflection prospecting operations of a geological medium along at least two dimensions comprising:

selecting a velocity model according to each of said two dimensions of the explored geological medium;

applying to the acquired seismic data a prestack depth migration, achieving thereby a stacking in a depth domain of seismic events in the geological medium; and synthesizing zero-offset seismic data in a time domain by applying an exploding reflector technique to results of said stacking in the depth domain using the same velocity model as used for implementing said prestack depth migration.

2. A method as claimed in claim 1, comprising interpreting the synthesized seismic data.

3. A method as claimed in claim 2, comprising using a time migration technique for interpretation of the synthesized seismic data.

4. A method as claimed in claim 2, comprising using a time migration technique for interpretation of the synthesized seismic data and developing the velocity model from the interpreted data.

5. A method as claimed in claim 2, comprising using a time migration technique for interpretation of the synthesized seismic data and updating the velocity model from the interpreted data.

6. A method for synthesizing zero-offset seismic data from seismic data acquired in multiple-offset seismic reflection prospecting operations of a geological medium along three dimensions comprising:

selecting a velocity model according to each of said dimensions of the explored geological medium;

applying to the acquired seismic data a prestack depth migration, achieving thereby a stacking in a depth domain of seismic events in the geological medium;

synthesizing the zero-offset seismic data in a time domain by applying an exploding reflector technique to results of said stacking in the depth domain using the same velocity model as the one used for implementing said prestack depth migration; and applying to said synthesized seismic data a three-dimensions poststack depth migration.

7. A method for synthesizing zero-offset seismic data from seismic data acquired in multiple-offset seismic reflection prospecting operations of a geological medium along three dimensions comprising:

selecting a velocity model according to each of said dimensions of the explored geological medium;

applying to the acquired seismic data a prestack depth migration, achieving thereby a stacking in a depth domain of seismic events in the geological medium;

synthesizing the zero-offset seismic data in a time domain by applying an exploding reflector technique to results of said stacking in the depth domain using the same velocity model as the one used for implementing said prestack depth migration; and applying to said synthesized seismic data a two-dimensions poststack depth migration to obtain post stack depth migration interpreted resulting data.

8. A method as claimed in claim 7, further comprising developing said velocity model from the interpreted resulting data.

9. A method as claimed in claim 7, further comprising updating said velocity model from the interpreted resulting data.

10. A method as claimed in claim 8, further comprising using a layer stripping technique for developing said velocity model from the interpreted resulting data.

11. A method as claimed in claim 9, further comprising using a layer stripping technique for developing said velocity model from the interpreted resulting data.

12. A method as claimed in claim 8, further comprising using a migration velocity scan technique for developing said velocity model from the interpreted resulting data.

13. A method as claimed in claim 9, further comprising using a migration velocity scan technique for developing said velocity model from the interpreted resulting data.

14. A method as claimed in claim 8, further comprising using a layer stripping technique for updating said velocity model for the interpreted resulting data.

15. A method as claimed in claim 9, further comprising using a layer stripping technique for updating said velocity model for the interpreted resulting data.

16. A method as claimed in claim 8, further comprising using a migration velocity scan technique for updating said velocity model from the interpreted resulting data.

17. A method as claimed in claim 9, further comprising using a migration velocity scan technique for updating said velocity model from the interpreted resulting data.

* * * * *